United States Patent
Maali et al.

(10) Patent No.: US 9,471,845 B1
(45) Date of Patent: *Oct. 18, 2016

(54) BACKGROUND MODELING FOR IMAGING SURVEILLANCE

(71) Applicant: PureTech Systems, Inc., Phoenix, AZ (US)

(72) Inventors: Fereydoun Maali, Scottsdale, AZ (US); Monroe M. Thomas, Toronto (CA); Dilip Swaminathan, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/040,597

(22) Filed: Feb. 10, 2016

Related U.S. Application Data

(63) Continuation of application No. 14/210,435, filed on Mar. 13, 2014, now Pat. No. 9,292,743.

(60) Provisional application No. 61/785,278, filed on Mar. 14, 2013.

(51) Int. Cl.
  *G06K 9/36* (2006.01)
  *G06K 9/38* (2006.01)
  *G06K 9/62* (2006.01)
  *G06K 9/00* (2006.01)

(52) U.S. Cl.
  CPC ............ *G06K 9/38* (2013.01); *G06K 9/00771* (2013.01); *G06K 9/6212* (2013.01); *G06K 9/6267* (2013.01)

(58) Field of Classification Search
  CPC .......................................... G06T 2207/20144
  See application file for complete search history.

(56) References Cited

U.S. PATENT DOCUMENTS 8,599,261 B1 * 12/2013 Maali .................. H04N 7/183
                                                                    348/149
2013/0044951 A1 * 2/2013 Cherng .................. H04N 7/18
                                                                    382/170

OTHER PUBLICATIONS

Eveland et al., "Background Modeling for Segmentation of Video-Rate Stereo Sequences", IEEE publication, Jun. 1998, Bib sheet + 6 pages of article.*
Lawrence R. Rabiner, A Tutorial on Hidden Markov Models and Selected Applications in Speech Recognition, Proceedings of the IEEE, Feb. 1989, pp. 257-286, vol. 77, No. 2.
Chris Stauffer, et al., Learning Patterns of Activity Using Real-Time Tracking, IEEE Transactions on Pattern Analysis and Machine Intelligence, Aug. 2000, pp. 747-757, vol. 22, No. 8.

* cited by examiner

*Primary Examiner* — Brian P Werner
(74) *Attorney, Agent, or Firm* — Thomas W. Galvani, P.C.; Thomas W. Galvani

(57) ABSTRACT

A surveillance system and method includes imaging means for processing images so that objects in the foreground are detected in the background and threats are identified. In the method, the imaging means acquires images and an initial background model is constructed from those images. Pixels are classified as either background or foreground for subsequent processing stages. In some embodiments, the imaging means is fixed in location and attitude, while in other embodiments, the imaging means is mounted to a moving platform and can alter its attitude. In such mobile applications, the system exploits geo-referencing as an aid in determining information about the pixels.

19 Claims, 6 Drawing Sheets

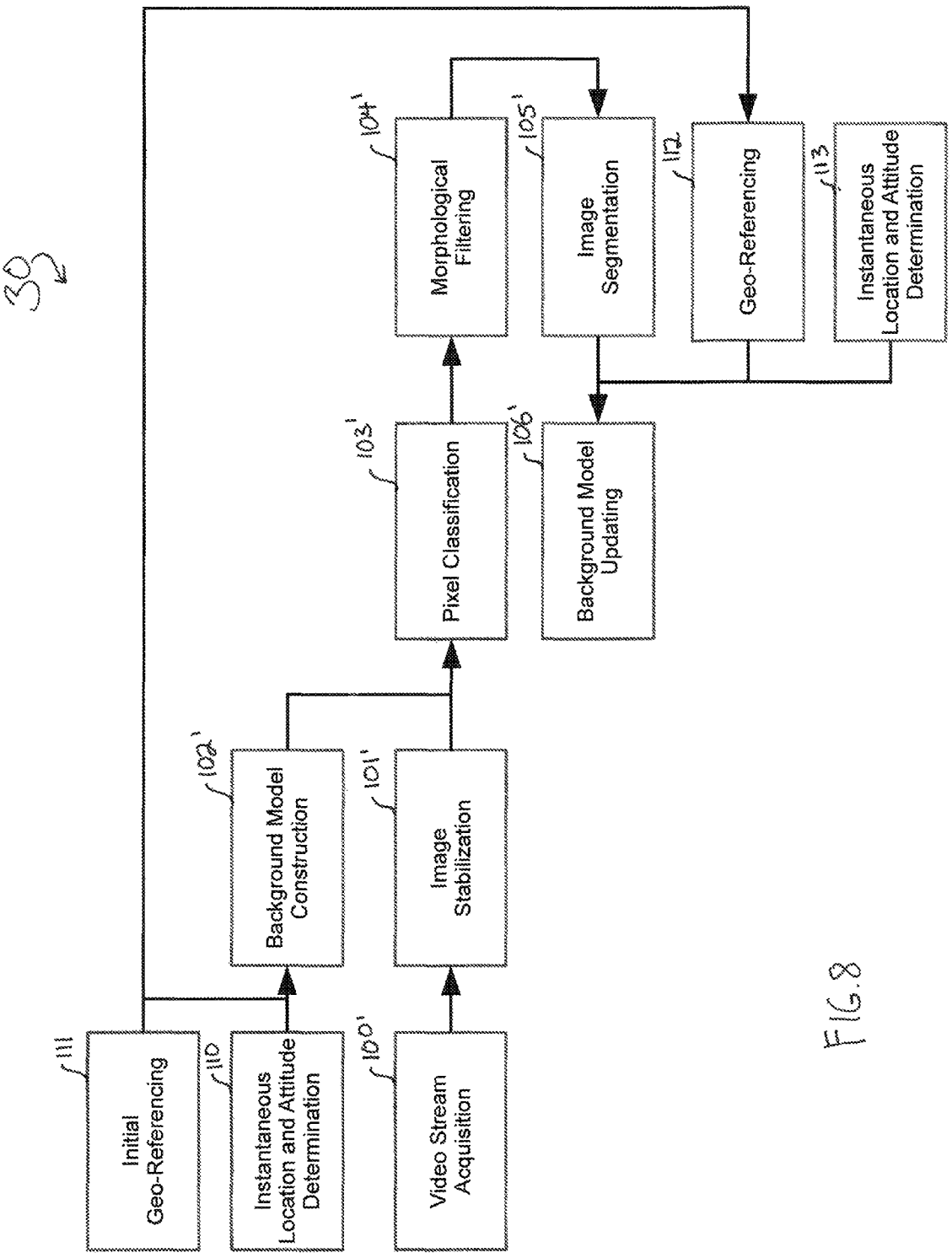

BACKGROUND MODELING FOR IMAGING SURVEILLANCE

CROSS-REFERENCE TO RELATED APPLICATIONS

This application is a continuation of and claims the benefit of pending U.S. patent application Ser. No. 14/210,435, filed Mar. 13, 2014, which claimed the benefit of U.S. Provisional Application No. 61/785,278, filed Mar. 14, 2013, all of which are hereby incorporated by reference.

FIELD OF THE INVENTION

The present invention relates generally to imaging, and more particularly to surveillance imaging analysis systems and methods.

BACKGROUND OF THE INVENTION

The usefulness of video surveillance systems is becoming increasingly acknowledged as the demand for enhanced safety has increased, both for fixed locations and properties and for moving vehicles. Locations commonly covered by such systems, include, for example, monitoring of harbors, airports, bridges, power plants, parking garages, public spaces, and other high-value assets. Traditionally, such camera networks require a labor-intensive deployment and monitoring by human security personnel. Human-monitored systems are, in general, relatively costly and prone to human error. For these reasons, the development of technology to automate the deployment, calibration, and monitoring of such systems will be increasingly important in the field of video surveillance. Moving vehicles, as well, would benefit from the greater safety provided by video surveillance, which could, for example, alert the driver of a passenger car of a foreign object in the road, or in the case of a driverless vehicle, alter the planned route because of a detected object or obstacle in the planned route.

For example, in automated video surveillance of sensitive infrastructures, it is always desirable to detect and alarm in the event of intrusion. To perform such a task reliably, it is often helpful to classify detected objects beforehand and to also track such detected objects in an attempt to discern from their actions and movements whether the objects pose an actual threat. Detecting an object is no easy task, however. It requires powerful video analytics and complex algorithms supporting those analytics. For example, a pixel in an aligned image sequence, such as a video stream, is represented as a discrete time series. The states of that time series are not observable, but, through an abstraction operation, they do aid in the observation of the state of the pixel at a given time, which depends on the immediately prior state, and not necessarily on earlier states, much as in the way a Hidden Markov Model is used. It often requires determining which portions of a video or image sequence are background and which are foreground, and then detecting the object in the foreground. Further, object detection is complicated when the camera imaging the target moves, either because it is mounted to something which is mobile or because the camera is monitoring a wide field of view by a step-and-stare method of camera movement.

Generally, the video surveillance system is unable to determine the actual size of an object, which can make threat detection even more difficult. With actual size detection, benign objects can be better differentiated from real threats. Moreover, the kinematics of an object, such as its velocity, acceleration, and momentum, are much more difficult to analyze when real size is unknown.

Additionally, georeferencing with a single camera demands the existence of landmark-rich scenes which may not be available in many instances, such as in the surveillance of ports and harbors, or when a site is being remotely—and perhaps covertly—monitored, and it is not feasible to introduce synthetic landmarks into the scene. Clearly, in reference to the above-described issues, the development of systems to improve the efficiency and effectiveness of automated video surveillance is needed.

SUMMARY OF THE INVENTION

In one embodiment, a surveillance method includes the steps of providing an imaging means, acquiring images from the imaging means, each image comprising a plurality of pixels. The method further includes producing a histogram of a characteristic property for analysis of each of the pixels, and analyzing the histogram for each pixel so as to assign each pixel with one of a background state and a foreground state. The method further includes classifying each pixel as one of background and foreground based on the assignment of the pixel with the one of the background state and the foreground state.

In another embodiment, a surveillance method includes the steps of providing an imaging means, acquiring images from the imaging means, each image comprising a plurality of pixels, and producing an initial background model of the pixels. The method further includes analyzing characteristic properties of the image including a grayscale characteristic property and a gradient orientation characteristic property, and producing a first histogram for each pixel for the grayscale characteristic property and a second histogram for each pixel for the gradient orientation characteristic property. The method further includes analyzing each of the first and second histograms for each pixel so as to assign each pixel with one of a background state and a foreground state, and classifying each pixel as one of background and foreground based on the assignment of the pixel with the one of the background state and the foreground state.

In yet another embodiment, a surveillance method includes the steps of providing an imaging means, acquiring images from the imaging means, each image comprising a plurality of pixels, and producing an initial background model of the pixels. The method further includes analyzing characteristic properties of the image including a grayscale characteristic property and a gradient orientation characteristic property, producing a first histogram for each pixel for the grayscale characteristic property and a second histogram for each pixel for the gradient orientation characteristic property, and analyzing each of the first and second histograms for each pixel so as to assign each pixel with one of a background state and a foreground state. The method still further includes classifying each pixel as one of background and foreground based on the assignment of the pixel with the one of the background state and the foreground state, and updating the initial background model with each pixel classified as background.

BRIEF DESCRIPTION OF THE DRAWINGS

Referring to the drawings:

FIG. 8 is a generalized process flow diagram of an alternate embodiment of a video camera surveillance method for a mobile camera, constructed and arranged according to the principle of the invention, and including a background model construction step and a pixel classification step.

DETAILED DESCRIPTION

Figure 1:
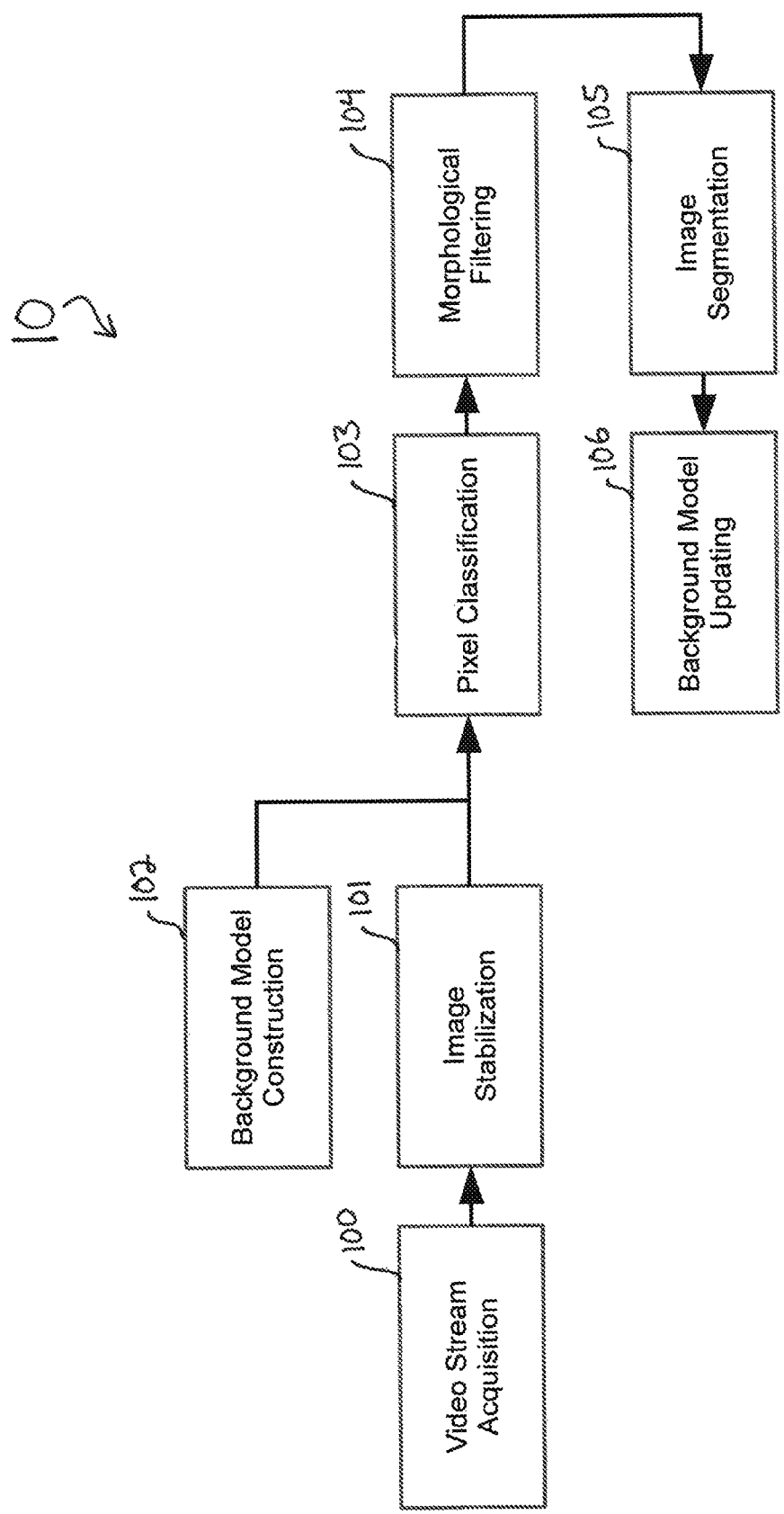
FIG. 1 is a generalized process flow diagram of a video camera surveillance method constructed and arranged according to the principle of the invention, and including a background model construction step and a pixel classification step.

Reference now is made to the drawings, in which the same reference characters are used throughout the different figures to designate the same elements. FIG. 1 generally illustrates the principal stages of a surveillance process 10 of a system for imaging, analyzing, detecting threats in terrain space. A video camera capable of panning, tilting, and zooming is provided, set up in a location, and directed at the terrain space. The camera may be mounted in a fixed location or to a moving platform, such as a floating dock, a train, unmanned vehicle, boat, or other similar moving platform. The video camera begins to record a video stream, shown in the video stream acquisition step 100. The video stream consists of a series of sequential images in image space. The images in the video stream are then stabilized in step 101 to remove any shakiness caused by the movement of the camera due to environment conditions, movement of the platform on which the camera is mounted, or for some other reason. In step 102, a multi-modal background model is constructed from individual pixels within each image of the video stream. The pixels are classified into different categories or classifications in step 103, and the step 104 of morphological filtering removes any errors or fragmentation. An object in the image space, corresponding to an object in the terrain space is next detected and its size is computed in step 105. Determining the size of the object in image space allows the system to determine a real size of the object in terrain space, when the system has information about the location, distance, and position of the object in terrain space. Finally, the initial background model is updated in step 106 with information acquired or determined in steps 103-105, such as the classification of pixels as background.

The system includes a pan-tilt-zoom enabled ("PTZ") camera, and preferably a plurality of cameras, which capture images or video of objects in real space, or terrain space, into camera space, or image space. Terrain space is the real world, and camera space is a two-dimensional abstraction of the terrain space as imaged by the camera. The camera records a video stream of the terrain space as is conventional and well-known in step 100. It is noted that the camera may be fixed in position and attitude, may be fixed and position and mobile in attitude, or may be mobile in both position and attitude, as would occur when the camera is mounted to a mobile platform.

In the image stabilization step 101, individual frames in the video stream are adjusted to align images within the frames with respect to each other. Image stabilization reduces the effect of small movements and trembles of the camera that may be caused by wind, mechanical aberrations, movement of the camera or the platform on which the camera is mounted, and the like.

Figure 2:
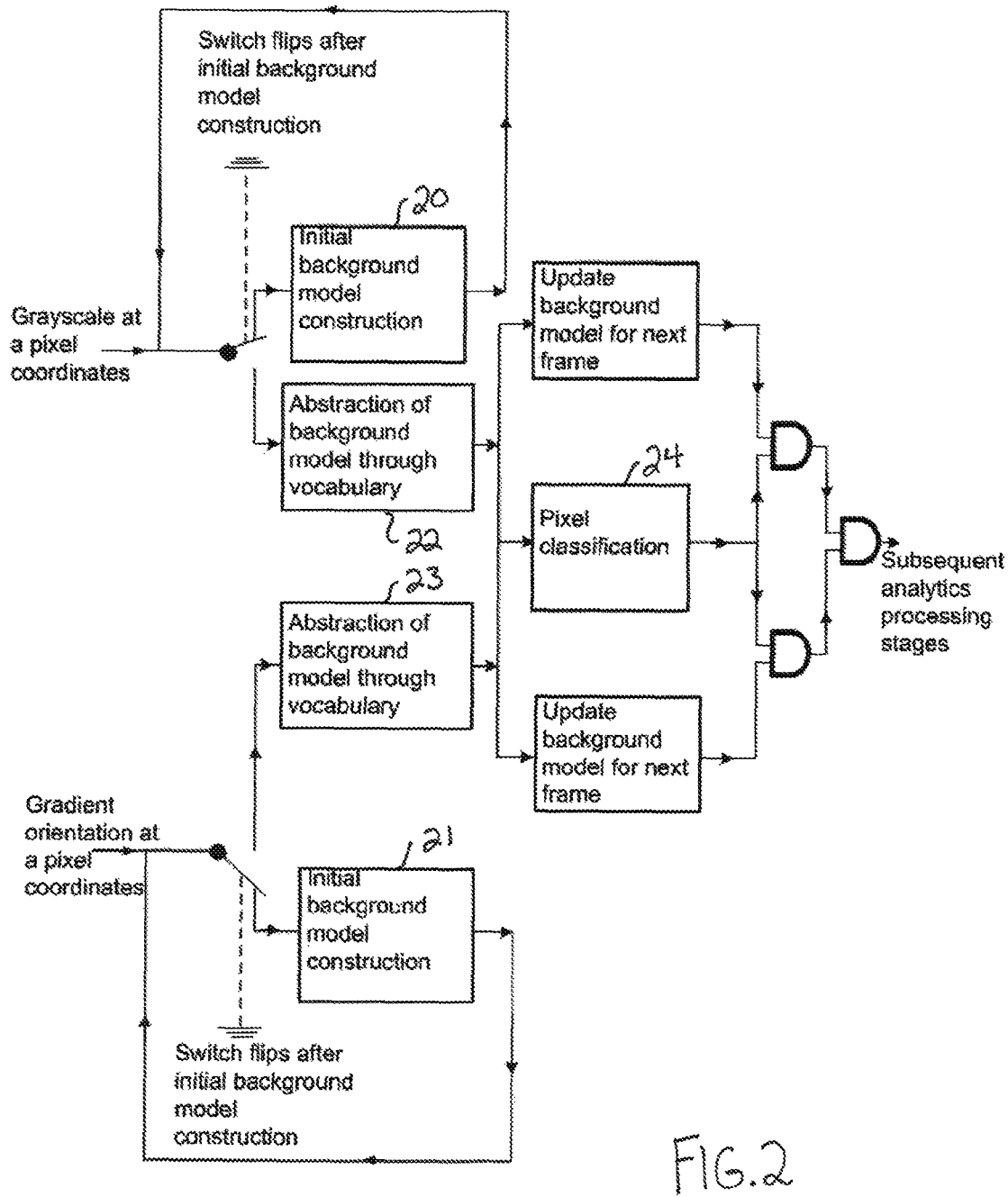
FIG. 2 is a generalized process flow diagram illustrating a portion of the diagram of FIG. 1 in greater detail, and showing the background model construction and pixel classification steps of FIG. 1.

Background modeling is performed in step 102 of FIG. 1 to construct a probability distribution, in the form of a histogram, for each pixel at every pixel coordinate in the images of the video stream. The histogram is then used to determine whether the pixel at that pixel coordinate should be classified as background, foreground, or something else, as will be explained. A range of characteristic properties may be used to construct a multi-modal background model, and those characteristic properties are not exclusive. Briefly, in probabilities and statistics, a mode is defined as a value which appears most frequently within a set of data, and thus has a maximum within a probability distribution. Multiple modes therefore are several frequently-appearing values within a set of data, and thus appear as local maximums on a distribution. A multi-modal model for each characteristic property will therefore have several peaks in its unique histogram. The camera is operative in a wide range of radiation, and as such, can image visible light, thermal radiation, and other electromagnetic waves. The characteristic properties for constructing a multi-modal background model are reflective of this. Preferably, two characteristic properties are used: grayscale and gradient orientation of the pixel at the pixel coordinate. FIG. 2 illustrates, in part, the background model construction step 102 using both grayscale and gradient orientation. One having ordinary skill in the art will readily appreciate that one of these characteristic properties may be used alone, or that several other characteristic properties may be used as well.

In FIG. 2, initial multi-modal background models are constructed based on the grayscale characteristic property and the gradient orientation characteristic property in blocks 20 and 21, respectively. Constructing multi-modal background models includes constructing histograms of the grayscale and gradient orientation at each pixel of every pixel coordinate. This construction occurs at a speed defined by a frame or refresh rate, which is set manually by the user. This speed may be very slow, such as one frame per hour, for example only, or very fast, such as sixty frames per second, for example only. The histograms constructed represent underlying probability distributions once a predefined or use-selected number of frames has been processed by the system. For example only, and not to limit the invention, a user may select that the initial background model construction step will be considered to have sufficiently constructed the histogram after five thousand frames have been processed. Preferably, the multi-modal background models for the different modes are constructed contemporaneously with each other and exclusively of other processing steps in the method 10.

Figure 3:
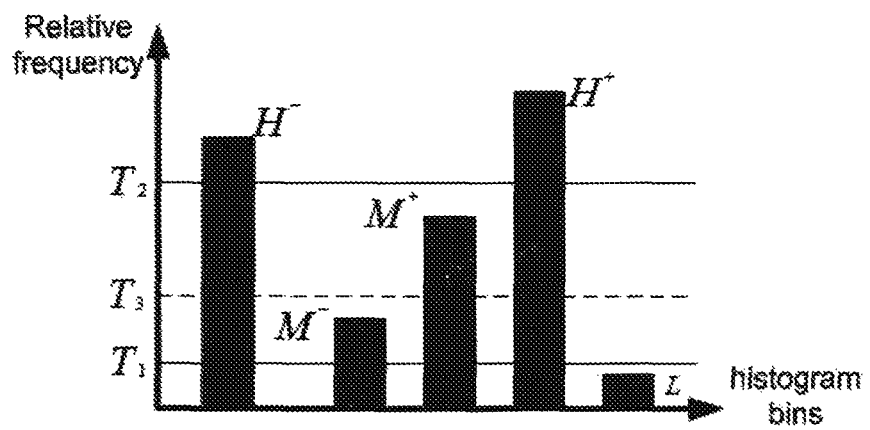
FIGS. 3, 4, and 5 illustrate histograms used in the background model construction and pixel classification steps of FIG. 1.

A histogram is built for each characteristic property. An exemplary histogram is shown in FIG. 3. Each histogram has a plurality of bins along the x-axis, which bins have heights measured along the y-axis representing the relative frequency of the bin which corresponds to a pixel at a pixel coordinate. A "last" bin, or right-most bin on the x-axis, corresponds to instances in which the pixel has either no gradient magnitude, or the gradient magnitude is below a predetermined level and thus is considered to be insufficient. In such cases where the gradient magnitude is insufficient, the last bin of the histogram is incremented.

The histogram is constructed by first identifying the bin which corresponds in value to the property of the pixel at the pixel coordinate. For example, if a pixel has a gradient orientation of one value, it will correspond to one bin, while if the pixel has a gradient orientation of another value, it will correspond to another bin. Likewise, and for example only, if a pixel has a low grayscale value, it will correspond to a different bin than if it had a high grayscale value. This corresponding bin will be referred to hereinafter as the "encompassing bin." Once the encompassing bin is identified, the system decrements all other bins in height. In some cases, as the user desires, bins immediately adjacent to the encompassing bin will not be decremented. In other cases, bins neighboring the encompassing bin will not be decremented. The user of the system is given the functionality to designate whether immediately-adjacent bins should not be decremented, whether neighboring bins should not be decremented, and if so, how many neighboring bins should not be decremented. In other words, the user may choose to define "neighboring bins" as the first bins to the sides of the encompassing bin, or may choose to define "neighboring bins" as the first and second bins to the side of the encompassing bin, or may choose to define "neighboring bins" as the first, second, and third bins to the side of the encompassing bin, etc. After decrementing all other bins, the system increments the encompassing bin. The encompassing bin is incremented by a growth factor $\delta_f$, the value of which is determined by equation (1) below:

$$\delta_f = k \cdot \log_e(f_{max} - f), \quad (1)$$

where f denotes the current frequency, $0 < k \leq 2.7$ is user-defined, and $f_{max} = 255$. Equation (1) is useful for conserving memory space and preventing buffer overrun or wrapping in a byte-deep circular buffer. In systems with greater amounts of memory and deeper buffers, the equation may be altered accordingly. In other embodiments, the constant k may be assigned different numbers as long as $(f+\delta_f)$ is truncated or capped at the level specified by $f_{max}$.

Once the multi-modal background model for a characteristic property is constructed as a histogram, that histogram is abstracted into vocabulary which can be more easily manipulated, in steps 22 and 23 of FIG. 2. Each characteristic property has its own unique vocabulary, and each vocabulary is instructive to the system regarding certain frequency values and thresholds, as will be explained. The vocabulary is defined by relative values within the histogram. The vocabulary for the grayscale histogram of FIG. 3 will be discussed first. Threshold values are established for the grayscale histogram. The threshold values in FIG. 3 are identified as $T_1$, $T_2$, and $T_3$, and are defined as follows:

$T_1$ is a low threshold. Bins having frequencies that are below this threshold correspond to pixels which are highly likely to have appeared infrequently, and hence, are likely to be the result or effect of a moving object. $T_1$ is thus helpful for identifying foreground.

$T_2$ is a user-defined threshold. This threshold is set by the user as a selected percentage of the most recurrent bin. Bins having frequencies above this correspond to pixels which have appeared many times before.

$T_3$ is a calculated threshold, determined by $T_3 = T_1 + \gamma(T_2 - T_1)$, where $\gamma$ is a user-defined constant.

The bins in FIG. 3 are next assigned intermediate symbols in the set $\{H^+, H^-, M^+, M^-, L\}$. These symbols are assigned based on the frequency value for each individual bin with respect to $T_1$, $T_2$, and $T_3$, and are useful when the pixel being analyzed possess grayscale. More specifically, the assignments are made based on the following rules:

Assign as $H^+$ if the bin is the most recurrent;

Assign as $H^-$ if the bin frequency exceed $T_2$ but is less than the most recurrent;

Assign as $M^+$ if the bin frequency exceeds $T_3$ but is less than or equal to $T_2$;

Assign as $M^-$ if the bin frequency exceed $T_1$ but is less than or equal to $T_3$; and Assign as $L$ if the associated bin frequency is below $T_1$.

Figure 4:
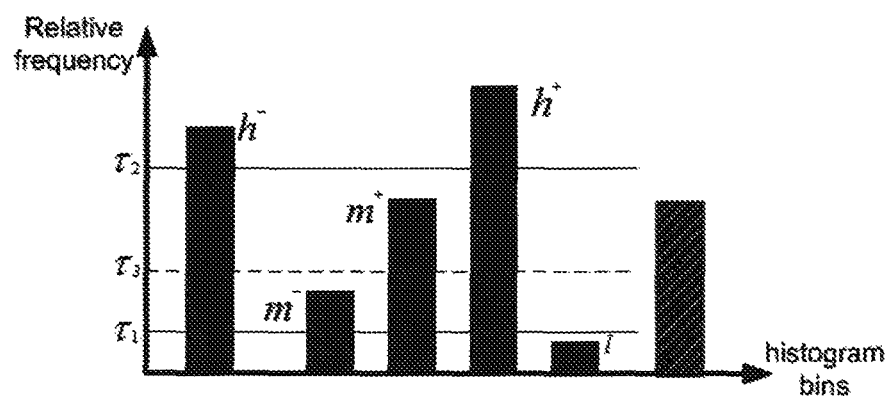

In the same way, but with different vocabulary, threshold values are established for the gradient orientation histogram. The gradient orientation histogram is shown in FIG. 4. The threshold values in FIG. 4 are identified as $\tau_1$, $\tau_2$, and $\tau_3$, and are defined as follows, similar to the values $T_1$, $T_2$, and $T_3$:

$\tau_1$ is a low threshold. Bins having frequencies that are below this threshold correspond to pixels which are highly likely to have appeared infrequently, and hence, are likely to be the result or effect of a moving object. $\tau_1$ is thus helpful for identifying foreground.

$\tau_2$ is a user-defined threshold. This threshold is set by the user as a selected percentage of the most recurrent bin. Bins having frequencies above this correspond to pixels which have appeared many times before.

$\tau_3$ is a calculated threshold, determined by $\tau_3 = \tau_1 + \gamma(\tau_2 - \tau_1)$, where $\gamma$ is a user-defined constant.

Figure 5:
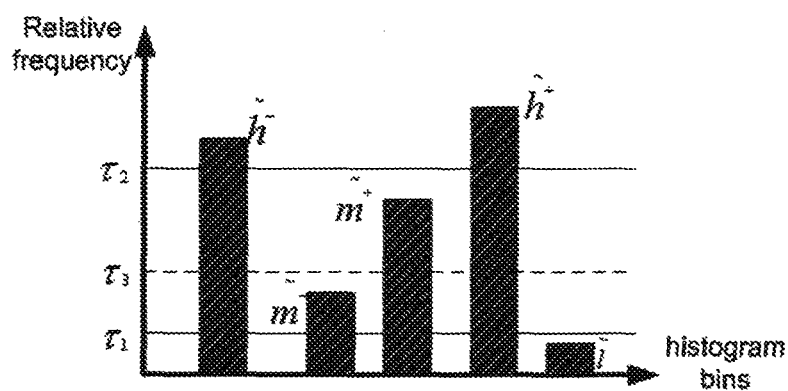

The intermediate symbols in the set $\{h^+, h^-, m^+, m^-, l\}$ are then assigned to the bins based on frequency of each bin in the gradient orientation histogram with respect to $\tau_1$, $\tau_1$, and $\tau_2$. These symbols are useful when the pixel being analyzed has sufficient, or at least non-negligible, gradient magnitude. When the pixel has a non-negligible gradient magnitude, it will possess a gradient orientation and is mapped to the gradient orientation histogram. Otherwise, if the pixel does not have the requisite gradient magnitude and thus has a negligible gradient magnitude, a different intermediate set of symbols are used, as seen in FIG. 5. That set includes $\{h^+, h^-, m^+, m^-, 1\}$.

After the intermediate symbol sets for grayscale and gradient magnitude have been determined and assigned, they are mapped onto $\{I_i | i=1 \ldots 5\}$ and $\{G_j | i=1 \ldots 5\}$, respectively. Likewise, those corresponding to the gradient orientation histogram last bin, which exhibit negligible gradient magnitude, are mapped onto $\{G^-_j | j=1 \ldots 5\}$.

Figure 6:
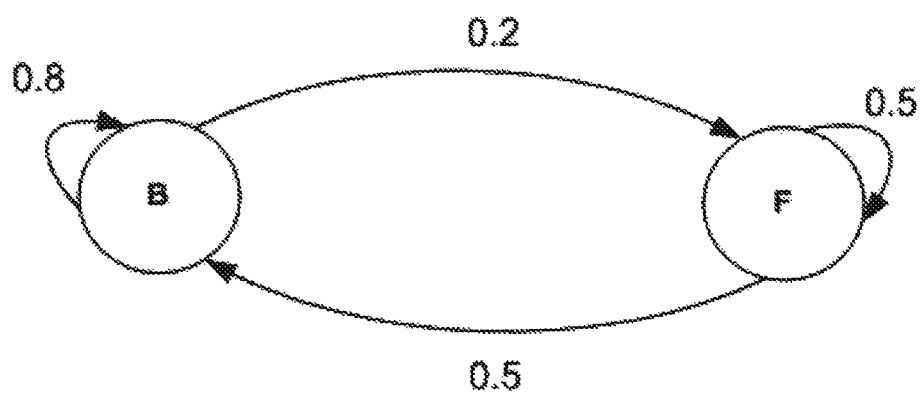
FIG. 6 is a state transition diagram used in the pixel classification step of FIG. 1.

Pixel classification occurs next, according to step 103 in FIG. 1. The pixels across all pixel coordinates are assigned to a "background" state. This assignment is for each property classification, such as grayscale, gradient orientation, and other properties that may be of interest. The background state is assigned to all pixels with the equation $q_{t-1} = B$, where "B" indicates "background" (and, as used later, "F" indicates "foreground"). This background state is used in the pixel classification block 24 of FIG. 2 (corresponding to step 103). After the initial background model is constructed for each property classification, a state transition matrix defines the probability of the state of a pixel changing. The matrix is shown diagrammatically in FIG. 6 (again, with "B" indicating "background" and "F" indicating "foreground") and below as matrix (2):

$$q_t = B \quad q_t = F$$

$$\begin{aligned} q_{t-1} &= B \begin{bmatrix} 0.8 & 0.2 \\ 0.5 & 0.5 \end{bmatrix} \\ q_{t-1} &= F \end{aligned} \quad (2)$$

The matrix (2) is useful for predicting a current state of the pixel based on its prior state. For example, if the pixel is currently assigned to the background state, then there is an 80% chance that the pixel will next be assigned the background state, and a corresponding 20% chance that the pixel will next be assigned the foreground state. On the initial classification, pixels are assumed to be background, and they are then classified according to the matrix (2) as well as the methodology described below.

Pixel classification begins in step 24 only after the initial background model is constructed, as in steps 20 and 21, and vocabulary for the histogram resulting from each multi-modal background model has been created as well, as in steps 22 and 23, respectively, of FIG. 2. Pixel classification includes, in part, the computation of probabilities for the co-occurrence of different property classification (grayscale, gradient orientation, etc.) when the encompassing bin for each property classification falls into a different range between the thresholds than the other property classifications. When corresponding encompassing bins for a pixel in both the grayscale and gradient orientation histograms have high frequencies, this is an indication that the pixel is likely background, because that pixel has been repeatedly identified with that encompassing bin in the past. On the other hand, when corresponding encompassing bins for a pixel in both the grayscale and gradient orientation histograms have low frequencies, this is an indication that the pixel is likely foreground, because that pixel has not been repeatedly identified with the encompassing bin in the past, and therefore has not yet been sufficiently observed. Finally, when corresponding encompassing bins for a pixel in both the grayscale and gradient orientation histograms have different frequencies, the assignment of the pixel to background or foreground is made much more uncertain, and thus, other means must be relied on to make the assignment, such as relying on the matrix (2) and the prior state of the pixel as either background or foreground. Those means rely on probabilities, which are then compared in the below equations.

In some cases, in which the corresponding encompassing bins for a pixel in both the grayscale and gradient orientation histograms have different frequencies, but the grayscale frequency is low while the gradient orientation frequency is high, the pixel is likely part of a shadow, and thus, is assigned as background.

Equation (3) below is used when the pixel exhibits a sufficient or valid gradient orientation, as in FIGS. 3 and 4, while Equation (2) is used when the pixel lacks sufficient gradient magnitude to be assigned a gradient orientation, as in FIG. 5.

$$P(I_i, G_j | q_t = B) = \frac{W_i P(I_i | q_t = B) + w_j P(G_j | q_t = B)}{W_i + w_j}, \quad (3)$$

and $$P(I_i, \tilde{G}_j | q_t = B) = \frac{W_i P(I_i | q_t = B) + \tilde{w}_j P(G_j | q_t = B)}{W_i + \tilde{w}_j}, \quad (4)$$

where $$P(I_i | q_t = B) = \Pi f_i + \Phi_i (\Pi C_i - \Pi f_i) \quad (5),$$

and $$P(G_j | q_t = B) = \pi f_i + \phi_i (\pi C_i - \pi f_i) \quad (6),$$

in which $\Pi f_i$ is a user-defined probability floor for the $i^{th}$ symbol, $\Pi C_i$ is a user-defined probability ceiling for the $i^{th}$ symbol, $\pi f_i$ is a user-defined probability floor parameter for the $i^{th}$ symbol, $\lambda C_i$ and is a user-defined probability ceiling parameter for the $i^{th}$ symbol.

The following coefficients are then used in Equations (5) and (6), which relate the vocabulary abstracted from the histograms to the probabilities, when the pixel exhibits a sufficient or valid gradient orientation (as in FIGS. 3 and 4).

$$\phi_1 = \frac{H^+ - T_2}{H^+ - T_2}, \quad (7)$$

$$\phi_2 = \frac{H^- - T_2}{H^+ - T_2}, \quad (8)$$

$$\phi_3 = \frac{M^+ - T_3}{T_2 - T_3}, \quad (9)$$

$$\phi_4 = \frac{M^- - T_1}{T_3 - T_1}, \quad (10)$$

$$\phi_5 = \frac{L}{T_1}, \quad (11)$$

$$\phi_1 = \frac{h^+ - \tau_2}{h^+ - \tau_2}, \quad (12)$$

$$\phi_2 = \frac{h^- - \tau_2}{h^+ - \tau_2}, \quad (13)$$

$$\phi_3 = \frac{m^+ - \tau_3}{\tau_2 - \tau_3}, \quad (14)$$

$$\phi_4 = \frac{m^- - \tau_1}{\tau_3 - \tau_1}, \quad (15)$$

$$\phi = \frac{l}{\tau_1}, \quad (16)$$

and $$W_i + w_j | i = 1 \ldots 5; j = 1 \ldots 5$$

Similarly, the following relations are then used in Equations (5) and (6), which relate the vocabulary abstracted from the histograms to the probabilities, when the pixel lacks sufficient gradient magnitude to be assigned a gradient orientation (as in FIG. 5).

$$\tilde{\phi}_3 = \frac{\tilde{m}^+ - \tau_2}{\tilde{t}_2 - \tau_2}, \quad (17)$$

$$\tilde{\phi}_2 = \frac{\tilde{h}^- - \tau_2}{\tilde{h}^+ - \tau_2}, \quad (18)$$

$$\tilde{\phi}_3 = \frac{\tilde{m}^+ - \tau_3}{\tilde{t}_2 - \tau_3}, \quad (19)$$

$$\tilde{\phi}_4 = \frac{\tilde{m}^- - \tau_1}{\tau_3 - \tau_1}, \quad (20)$$

$$\tilde{\phi} = \frac{\tilde{l}}{\tau_1}, \quad (21)$$

and $$W_i + \widetilde{W} \mid i=1 \ldots 5; j=1 \ldots 5$$

Individual image pixel coordinates are assigned to the state of background (B) or foreground (F) according to rules defined by the following conditional equations:

$$q_t = \begin{cases} B \text{ if } P(I_i, G_j \mid q_t = B) \cdot P(q_t = B \mid q_{t-1}) > \\ P(I_i, G_j \mid q_t = F) \cdot P(q_t = F \mid q_{t-1}) \\ F \text{ otherwise} \end{cases} \quad (22)$$

$$q_t = \begin{cases} B \text{ if } P(I_i, \tilde{G}_j \mid q_t = B) \cdot P(q_t = B) \mid q_{t-1} > \\ P(I_i, \tilde{G}_j \mid q_t = F) \cdot P(q_t = F \mid q_{t-1}) \\ F \text{ otherwise} \end{cases} \quad (23)$$

where $q_t$ denotes the current state of the pixel at the pixel coordinate, and $q_{t-1}$ denotes the prior state.

Figure 7:
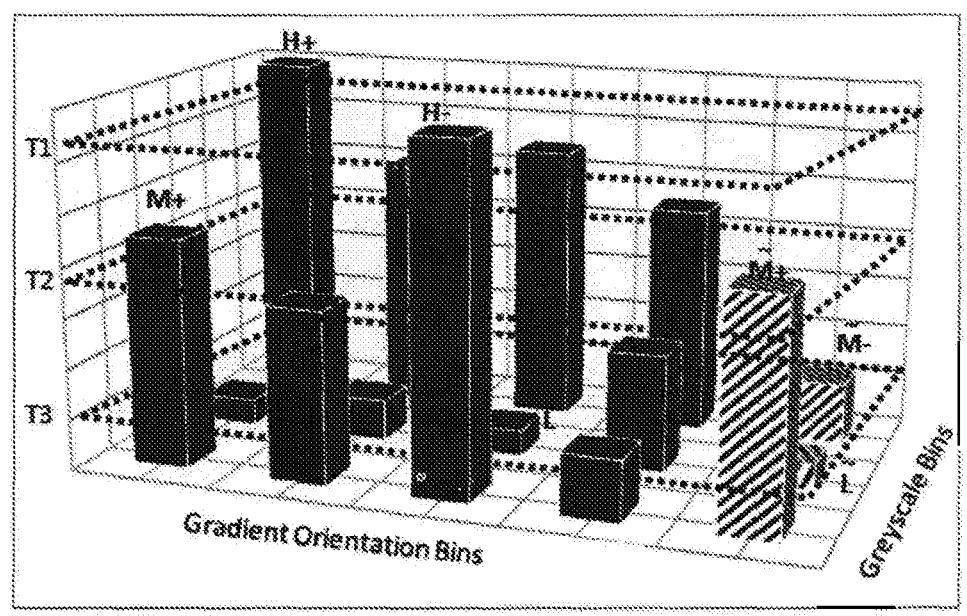
FIG. 7 illustrates a two-dimensional histogram used in the background model construction and pixel classification steps of FIG. 1.

It is noted that, where memory and processing power of the system permit, the multiple modes may be modeled on a two-dimensional histogram or scattergram rather than separate histograms. FIG. 7 illustrates an exemplary scattergram displaying both grayscale and gradient orientation bins in a two-dimensional fashion. The bin frequencies in the scattergram are incremented and decremented as already described above with respect to the separate histograms of FIGS. 3, 4, and 5. Moreover, three thresholds, $T_1$, $T_2$, and $T_3$, are used as above to abstract the scattergram bin frequencies by a set of intermediate symbols $\{H^+, H^-, M^+, M^-, L\}$. The assignments of intermediate symbols are made based on the following rules:

Assign as $H^+$ if the bin is the most recurrent;

Assign as $H^-$ if the bin frequency exceed $T_2$ but is less than the most recurrent;

Assign as $M^+$ if the bin frequency exceeds $T_3$ but is less than or equal to $T_2$;

Assign as $M^-$ if the bin frequency exceed $T_1$ but is less than or equal to $T_3$; and Assign as $L$ if the associated bin frequency is below $T_1$. (24)

And, when the pixel does not exhibit sufficient gradient magnitude and thus cannot be assigned a gradient orientation, the following intermediate symbols are used instead of the above intermediate symbols:

Assign as $\widetilde{H^+}$ if the bin is the most recurrent;

Assign as $\widetilde{H^-}$ if the bin frequency exceed $T_2$ but is less than the most recurrent;

Assign as $\widetilde{M^+}$ if the bin frequency exceeds $T_3$ but is less than or equal to $T_2$;

Assign as $\widetilde{M^-}$ if the bin frequency exceed $T_1$ but is less than or equal to $T_3$; and Assign as $\tilde{L}$ if the associated bin frequency is below $T_1$. (25)

As before, the intermediate symbols defined in rules (24) and (25) above are mapped onto $\{v_i \mid i=1 \ldots 5\}$ and $\{v_i^- \mid i=1 \ldots 5\}$ respectively, for ease of reference. The first of these mappings is used when the pixels have a valid gradient orientation, and the second of these mappings is used when the pixels do not exhibit a sufficient gradient magnitude or any meaningful gradient orientation.

Before finally classifying the pixels as either background or foreground, another series of probabilities are determined. When the pixel has a sufficient gradient magnitude and thus a gradient orientation, the following probabilities are determined:

$$P(v_i \mid q_t = B) = PL_i + \psi_i(PU_i - PL_i) : i = 1 \ldots 5 \quad (26),$$

where $PL_i$ is a user-defined lower-bound probability for the $i^{th}$ symbol, $PU_i$ is a user-defined upper-bound probability for the $i^{th}$ symbol, $$\psi_1 = \frac{H^+ - T_2}{H^+ - T_2}, \quad (27)$$

$$\psi_1 = \frac{H^+ - T_2}{H^+ - T_2}, \quad (28)$$

$$\Psi_3 = \frac{M^+ - T_3}{T_2 - T_3}, \quad (29)$$

$$\Psi_4 = \frac{M^- - T_1}{T_3 - T_1}, \quad (30)$$

and $$\Psi_5 = \frac{L}{T_1} \quad (31)$$

Then, finally, individual pixels are classified to either the background or foreground according to:

$$q_t = \begin{cases} B if P(v_i | q_t = B) \cdot P(q_t = B | q_{t-1}) > \\ P(v_i | q_t = F) \cdot P(q_t = F | q_{t-1}) \\ F \text{ otherwise} \end{cases} \quad (31)$$

This equation (31) ultimately determines whether the system classifies a pixel as foreground or background, when the pixel exhibits sufficient gradient magnitude and hence gradient magnitude orientation. Conversely, when the pixel lacks sufficient gradient magnitude and hence gradient orientation, the following set of equations govern the computation of probabilities and classification of pixels:

$$P(\tilde{v}_i | q_t = B) = \widetilde{PL}_t + \widetilde{\Psi}_t (\widetilde{PU}_t - \widetilde{PL}_t) : i = 1 \ldots 5 \quad (32)$$

where $$\widetilde{\Psi}_1 = \frac{\tilde{H}^- - T_2}{\tilde{H}^- - T_2}, \quad (33)$$

$$\widetilde{\Psi}_1 = \frac{\tilde{H}^+ - T_2}{\tilde{H}^+ - T_2}, \quad (34)$$

$$\widetilde{\Psi}_3 = \frac{\tilde{M}^+ - T_3}{T_2 - T_3}, \quad (35)$$

$$\widetilde{\Psi}_4 = \frac{\tilde{M}^- - T_1}{T_3 - T_1}, \quad (36)$$

and $$\widetilde{\Psi}_5 = \frac{\tilde{L}}{T_1} \quad (37)$$

Then, finally, for those pixels lacking sufficient gradient magnitude, the pixels are assigned to the background or foreground according to:

$$q_t = \begin{cases} B if P(\tilde{v}_i | q_t = B) \cdot P(q_t = B | q_{t-1}) > \\ P(\tilde{v}_i | q_t = F) \cdot P(q_t = F | q_{t-1}) \\ F \text{ otherwise} \end{cases} \quad (38)$$

The state of a pixel as background or foreground, as having been determined by the pixel classification step, may later be changed in response to information acquired or applied during subsequent processing steps, such as morphological operation or image segmentation.

The invention thus far described is useful for classifying pixels into foreground and background. A particular challenge in this process is avoiding the absorption into background of objects or information which truly are part of the foreground. For instance, on an airplane runway, foreign object detection is extremely important. Small objects such as nails, scrap metal, rubber, or the like pose a tremendous danger to aircraft during landing and take-off. However, because such objects are essentially inert but may be introduced or moved by large planes which may conceal those objects, detection of them is difficult. The present invention, however, has means for dealing with this challenge.

The present invention has flexibility because the amount of the incrementation and decrementation of the histograms can be adjustably set by the user to coordinate that incrementation and decrementation with respect to a rate at which background model udpating occurs, or with respect to a particular region of interest that a user may desire to monitor more or less frequently than other regions. Even different background model refresh rates can be specified for different image regions of interest. For example, distant regions, in which a pixel covers a larger area than a pixel in a close region, may be assigned a slower refresh rate to allow for the transition of moving objects from one pixel to another compared to a close region.

The system supports the detection of slowly-moving (or non-moving) objects concurrently with fast-moving objects, such as would be the situation with a foreign object on a runway being taxied by an airplane. The system sets the rate at which background model updating occurs so that oscillatory movement is absorbed into the background, as such oscillatory movement often has non-random periodicities, such as in the trembling of leaves and branches in the wind. Such a background model will suppress stationary pixels (i.e., pixels not associated with motion). Additionally, the background model will adapt and suppress pixels associated with regular oscillatory motion, as opposed to random oscillatory movement. However, the background model may also suppress motion due to relatively slow objects intruding into monitored premises (such as a human crawling slowly). This presents a hazard, because potential intruders with knowledge of the system's operations would be able to defeat the system by crawling through the monitored terrain space very slowly, and essentially be absorbed into the background. To combat this, a plurality of multi-modal background models are used and updated according to the following numbered steps:

1. An optimally-refreshed background model, which effectively absorbs oscillatory movement as described above, is used until it develops an excessive amount of noise or artifacts.
2. The optimally-refreshed background model is then copied as additional background models.

3. Those additional background models are then used together with the optimally-refreshed background model, but are refreshed at slower rates to detect slowly-moving objects.

4. The optimally-refreshed background model and the additional background models are used concurrently in parallel to both absorb oscillatory movement into the background and to reveal slow-moving objects as foreground, respectively.

5. Steps 2-4 are repeated periodically, at a period much longer than the refresh rate of the optimally-refreshed background model, overwriting the additional background models with new additional background models. Moreover, if additional information is acquired in subsequent processing stages, steps 2-4 are immediately repeated with that new information.

The background model can be refreshed at rates other than the pixel classification rate. Pixel classification is performed at an analytics nominal processing frame rate, such as 15 frames per second ("fps"), or 7.5 fps, while the background model refresh intervals remain responsive to detection of intended class of targets of certain speed range, say, a crawling human, which could extend to several seconds. More specifically, multi-modal background models with different refresh rates will have their own dedicated and independent subsequent processing stages of pixel classification and segmentation. As such, anomalies—such as noise in the form of unwanted foreground—resulting from the departure of slower refreshing background models from an optimally-refreshing multi-modal background model will be detected readily, and when the extent of the anomalies becomes excessive, such as by a pre-defined threshold, the optimally-refreshing multi-modal background model is copied to new the additional background models, as described in step 2 above.

In yet another embodiment of the present invention, application of the multi-modal background model is extended from fixed video cameras to cameras mounted on mobile platforms, such as automated guide vehicle (AGVs), unmanned waterborne vessels, high speed trains, mobile phones, and the like. A process 30 for operating a mobile video camera surveillance system is displayed graphically in FIG. 8. That process 30 is similar to the process 10, and as such, many of the steps shown in FIG. 8 are identical to the steps shown in FIG. 1. Those identical steps use the same reference characters, but are marked with a prime ("'") symbol in FIG. 8 to distinguish them from the steps of FIG. 1. The construction of a multi-modal background model for a mobile camera relies on the correspondence between terrain space and camera space, even during movement of the mobile camera, and the change in a characteristic property in the pixels of the terrain space as the camera moves. Preferably, grayscale is the characteristic property used in the system. As the camera moves, then the correspondence between successive pixels in the terrain space over time must be taken into account to accurately monitor, identify, and compare grayscale. Only after this correspondence is accounted for can the histogram for each pixel can be updated.

Based on the direction and distance of movement, a pixel at one time may correspond to one pixel, several pixels, several partial pixels, or one or more pixels together with one or more partial pixels (and vice versa) at another time, because the area covered by the pixels is not equal; cells closer to the camera cover a smaller area of terrain space than do cells further from the camera. This correspondence is made possible by georeferencing the camera in accordance with the method described in U.S. Pat. No. 8,253,797. As described in that patent, georeferencing the camera produces equations for rays in three-space emanating from the camera, with each ray being associated with a camera pixel coordinate when the camera has a specified attitude or orientation. Then, as the camera moves because of either movement of the camera platform or change in attitude, those equations are correspondingly transformed to reflect the camera's new location and attitude. The camera location is continually determined and monitored by a GPS system carried on board in step 110, and the attitude of the camera is likewise continually determined and monitored by both vertical gyros and course gyros (or MEMS or AHRS equivalents thereof) in step 111 in FIG. 8. This allows the system to have knowledge of both the camera's location and attitude at all times. This knowledge, together with a digital elevation map of the terrain space stored in system memory, allows the system to instantaneously create the correspondence between pixels of the terrain space as the camera moves. Preferably, the digital elevation map for the terrain space over the entire area of operation, such as an entire rail line or an entire harbor space for example, is stored on board, and in other cases the digital elevation map is incrementally downloaded as the camera moves. The system performs an intersection of the transformed ray equations with the digital elevation map to determine the coordinates of each pixel in the terrain space, which allows the system to relate the pixels during movement of the camera.

In embodiments of the present invention which use step-and-stare cameras, background modeling and pixel classification are useful for detecting permanent changes since the last visit to a particular view from the camera, and also for detecting transient changes while the camera is fixed and focused on one sector. Once pixel classification has occurred and subsequent processing stages like morphological filtering and image segmentation have been completed, a georeferencing step 112 and a location and attitude determination step 113 are again performed, so as to update the background model in step 106'. Those steps 112 and 113 are identical to the steps 111 and 110, respectively, but for the fact that they occur later in the process. PTZ cameras are preferably used for step-and-stare operation. Such PTZ cameras can operate in step-and-stare mode in which the camera holds a view on a directional alignment and takes a picture or records video, then pans to a new view in a new alignment just offset from the previous alignment, again takes a picture or records a video, and repeats this process until the entire field of view has been captured. PTZ cameras are capable of rotating and capturing 360 degrees of view through a contiguous set of sequential steps, with each successive steps covering an adjacent sector. The use of PTZ cameras allows a much larger field of view to be monitored than would be possible with a single camera or a plurality of fixed cameras.

The methodology used to determine or characterize a single pixel property is employed to determine or characterize multiple pixel properties (such as grayscale and gradient orientation) and can be used to construct two independent histograms or a single, two-dimensional histogram or scattergram, as described above. The modeling process described here, however, is augmented by additional processing channels yielding a multichannel detection (MCD) scheme. The step-and-stare background modeling and pixel classification process is performed in the context of a multichannel detection (MCD) scheme, comprising five channels: $\{x_i|i=1 \ldots 5\}$, each described below:

$$x_1\{f\text{Diff}(b\text{Img}_{t-1},\text{Img}_{t+r})|r=0 \ldots R\},$$

$$x_2\{fg(Bgnd\text{Model}_{t-1},\text{Img}_{t+r})|r=0 \ldots R\},$$

$$x_3\{fg(Bgnd\text{Model}_{t-1+r},\text{Img}_{t+r})|r=0 \ldots R\},$$

$$x_4\{f\text{Diff}(b\text{Img}_{t-1+r},\text{Img}_{t+r})|r=0 \ldots R\},$$

and $$x_5\{f\text{Diff}(\text{Img}_{t-1+r},\text{Img}_{t+r})|r=0 \ldots R\}$$

where:
1. fDiff is a frame-differencing operation between two images yielding a resultant image, where a first image is constructed from the highest frequency value of all of the pixels, and a second image includes the successive images in time. In $x_1$, the multi-modal background model is initially constructed and not updated. In $x_4$, the multi-modal background model is updated. In $x_5$, successive images are compared to each other, rather than to a multi-modal background model.
2. fg is an operation for computing a foreground image from the multi-modal background model resulting from the last visit to a particular camera view with successively incoming images. In $x_2$, the multi-modal background model is not updated, while in $x_3$, the multi-modal background model is updated.
3. $b\text{Img}_{t-1}$ is an image whose pixel coordinates retain the characteristic property (grayscale, for example) identified with the dominant mode of the multi-modal background model.

Before detecting permanent changes from the last visit to a sector, the following steps are performed. The last multi-modal background model that had been saved in memory or in mass storage is retrieved and placed into the fast buffer. An image whose pixel coordinates retain the grayscale identified with the dominant mode of the multi-modal background model for every pixel coordinates is constructed. The reference image associated with that sector (i.e. step) is retrieved and placed in the fast-access buffer. Through a registration process, successive images are aligned and saved prior to the camera moving away from the sector.

The present invention is described above with reference to a preferred embodiment. However, those skilled in the art will recognize that changes and modifications may be made in the described embodiment without departing from the nature and scope of the present invention. To the extent that such modifications and variations do not depart from the spirit of the invention, they are intended to be included within the scope thereof.

Having fully and clearly described the invention so as to enable one having skill in the art to understand and practice the same, the invention claimed is:

The invention claimed is:
1. A surveillance method comprising the steps of:
providing an imaging means mounted to a moving platform;
georeferencing the imaging means;
acquiring images from the imaging means, each image comprising a plurality of pixels;
producing a background model of the pixels;
producing a histogram of a characteristic property for analysis of each of the pixels;
analyzing the histogram for each pixel, thereby facilitating assignment of each pixel with one of a background state and a foreground state; and
classifying each pixel as one of background and foreground based on the assignment of the pixel with the one of the background state and the foreground state.

2. The method of claim 1, further comprising the step of updating the background model with each pixel after the step of classifying each pixel.

3. The method of claim 1, wherein the step of producing a histogram includes choosing one of a grayscale characteristic property and a gradient orientation characteristic property as the characteristic property of the image.

4. The method of claim 1, wherein the histogram has multiple modes.

5. The method of claim 1, wherein the step of producing a histogram includes:
providing bins to the histogram, each bin corresponding to a value of the characteristic property, and each bin having a height corresponding to the frequency of the value;
determining the value of the characteristic property for each pixel;
identifying each pixel with an encompassing bin having the value corresponding to each pixel;
decrementing the height of all bins which are not the encompassing bin; and
incrementing the height of the encompassing bin.

6. The method of claim 5, wherein the step of producing a histogram further includes assigning the pixel to a last bin, instead of the encompassing bin, when the value of the characteristic property of the pixel is absent.

7. The method of claim 5, wherein the step of analyzing the histogram further includes abstracting the histogram by:
establishing high, low, and medium thresholds for the histogram;
assigning a symbol to each bin dependent on the height of the bin relative to the thresholds; and
determining a probability that the pixel corresponding to the histogram is one of the background state and foreground state from a comparison of the symbols of each bin to each of the thresholds.

8. A surveillance method comprising the steps of:
providing an imaging means mounted to a moving platform;
georeferencing the imaging means;
acquiring images from the imaging means, each image comprising a plurality of pixels;
producing a background model of the pixels;
analyzing characteristic properties of the image including a grayscale characteristic property and a gradient orientation characteristic property;
producing a first histogram for each pixel for the grayscale characteristic property and a second histogram for each pixel for the gradient orientation characteristic property;
analyzing each of the first and second histograms for each pixel, thereby facilitating assignment of each pixel with one of a background state and a foreground state; and
classifying each pixel as one of background and foreground based on the assignment of the pixel with the one of the background state and the foreground state.

9. The method of claim 8, further comprising the step of updating the background model with each pixel after the step of classifying each pixel.

10. The method of claim 8, wherein the first and second histograms are combined as a two-dimensional histogram containing information about both the grayscale characteristic property and the gradient orientation characteristic property.

11. The method of claim 8, wherein the step of producing first and second histograms includes, for each of the first and second histograms, the steps of:
    providing bins to the respective first and second histograms, each bin corresponding to a value of the respective grayscale and gradient orientation characteristic property, and each bin having a height corresponding to the frequency of the value;
    determining the value of the respective grayscale and gradient orientation characteristic property for each pixel;
    identifying each pixel with an encompassing bin having a value corresponding to each pixel;
    decrementing the height of all bins which are not the encompassing bin; and
    incrementing the height of the encompassing bin.

12. The method of claim 11, wherein the step of producing the first and second histograms further includes assigning the pixel to a last bin, instead of the encompassing bin, when the value of the gradient orientation characteristic property of the pixel is absent.

13. The method of claim 11, further comprising the step of evaluating the heights of the encompassing bins in the first and second histograms, thereby facilitating the step of classifying each pixel.

14. The method of claim 11, wherein the step of analyzing the first and second histograms further includes abstracting each of the first and second histograms by:
    establishing high, low, and medium thresholds for the respective first and second histograms;
    assigning a symbol to each bin dependent on the height of the bin relative to the thresholds; and
    determining a probability that the pixel corresponding to the respective first and second histogram is one of the background state and foreground state from a comparison of the symbols of each bin to each of the thresholds.

15. The method of claim 14, wherein the step of classifying each pixel further includes the step of calculating a probability that each pixel is one of background and foreground based on comparing the heights of the encompassing bins of the first and second histograms.

16. The method of claim 14, further comprising the steps of:
    calculating a probability that each pixel is background;
    calculating a probability that each pixel is foreground; and
    comparing the probability that each pixel is background with the probability that each pixel is foreground.

17. The method of claim 8, further comprising, after the step of classifying each pixel, the steps of:
    calculating a probability that each pixel will transition from one of foreground to background and background to foreground;
    calculating a probability that each pixel will not transition; and
    comparing the probability that each respective pixel will transition with the probability that each respective pixel will not transition.

18. A surveillance method comprising the steps of:
    providing an imaging means mounted to a moving platform;
    georeferencing the imaging means;
    acquiring images from the imaging means, each image comprising a plurality of pixels;
    producing a background model of the pixels;
    analyzing characteristic properties of the image including a grayscale characteristic property and a gradient orientation characteristic property;
    producing a first histogram for each pixel for the grayscale characteristic property and a second histogram for each pixel for the gradient orientation characteristic property;
    analyzing each of the first and second histograms for each pixel facilitating assignment of each pixel with one of a background state and a foreground state;
    classifying each pixel as one of background and foreground based on the assignment of the pixel with the one of the background state and the foreground state; and
    updating the background model with each pixel.

19. The method of claim 18, wherein the step of updating the background model further includes:
    copying the background model as additional background models when the background model develops excessive noise;
    refreshing the background model at a first rate and the additional background models at other rates, each other rate being different than the first rate and from each other; and
    repeating the steps of copying and refreshing both periodically on a fixed period, and immediately in response to acquisition of additional information in the repeated steps of producing the first and second histograms, analyzing each of the first and second histograms, and classifying each pixel.

* * * * *